(12) United States Patent
Graham et al.

(10) Patent No.: US 6,898,474 B2
(45) Date of Patent: May 24, 2005

(54) METHOD AND SYSTEM FOR CREATING AND MANAGING ENGINEERED TIME STANDARDS

(75) Inventors: Randall J. Graham, Fort Worth, TX (US); Collin M. McCulley, Fort Worth, TX (US); James R. Fenton, Weatherford, TX (US); Albert R. Hewitt, Jr., Azle, TX (US); Philip S. Livers, Arlington, TX (US); Gary L. Lupher, Benbrook, TX (US); Douglas J. Schmidt, Dallas, GA (US); Raymond Swenson, Euless, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 226 days.

(21) Appl. No.: 10/410,960

(22) Filed: Apr. 9, 2003

(65) Prior Publication Data

US 2004/0204971 A1 Oct. 14, 2004

(51) Int. Cl.$^7$ .............................................. G06F 19/00
(52) U.S. Cl. ............................ 700/100; 700/80; 705/10
(58) Field of Search ......................... 700/100, 98, 101, 700/102, 107; 705/1, 10; 707/5; 717/126, 101

(56) References Cited

U.S. PATENT DOCUMENTS

| 5,671,415 A | * | 9/1997 | Hossain | 700/97 |
| 6,003,012 A | * | 12/1999 | Nick | 700/95 |

* cited by examiner

Primary Examiner—Kidest Bahta
(74) Attorney, Agent, or Firm—Baker Botts L.L.P.

(57) ABSTRACT

According to one embodiment of the invention, a computerized method for managing time standards includes receiving a set of work instructions associated with the manufacturing of a part and receiving an association of each work instruction of the set of work instructions with one or more of a plurality of time standard templates. Each time standard template includes a task associated with the manufacturing of the part at a task center, one or more variables associated with the task, one or more variables associated with the task center, and an algorithm operable to determine a time value associated with the task. The time value represents a time period to complete the task. The computerized method further includes receiving a change to one of the variables associated with the task, generating a plurality of time standards associated with the work instructions, and storing the time standards in a database.

34 Claims, 10 Drawing Sheets

Table Editor

Name: SOM  ~328
Description: Task Center Targets

| Name | Type | Width | Description |
|---|---|---|---|
| TASK-CTR | STRING | 10 | Task Center Designation |
| DEPT | STRING | 10 | Department Designation |
| G-TGT | FLOAT | 10 | G Standard (Based on Actual |
| C-TGT-SU | FLOAT | 10 | C SU Standard (Based on Av |
| C-TGT-RUN | FLOAT | 10 | C RUN Standard (Based on A |

[Add Field] [Del Field] [Edit Field] [Up] [Down]

| TASK-CTR | DEPT | G-TGT | C-TGT-SU | C-TGT-RUN |
|---|---|---|---|---|
| 500 | 0730 | 9.9615 | 0.0 | 0.0 |
| 505 | 0730 | 2.14 | 0.0 | 0.9843 |
| D03 | 0301 | 0.3137 | 0.1945 | 0.1976 |

[Add Record] [Edit Record] [Delete Record] [Save Table] [Done]

ETS Application Sheet Library

| Application Sheets/Task Groupings | | Assigned Templates | Template Library |
|---|---|---|---|
| 001_MAP | Part Handling | A9_990-017R PtHdlg Obtain 24-47 in. | COATINGS, ITAR, DELETE IF TO FOREI |
| 002_MAP | Shims | A9_990-021R PtHdlg Unload Standard | HOLD FOR RECLASSIFICATION + |
| 003_MAP | Manual Drill Holes | A9_990-022R PtHdlg Unload Standard | GENERAL + |
| 004_MAP | Manual Countersink | A9_990-033R PtHdlg Overhead Crane | BONDING AND COMPOSITES + |
| 005_MAP | Auto Drill | A9_990-034R PtHdlg Jib up/dwn | MACHINING + |
| 006_MAP | Setup Bolts | A9_990-039R PtHdlg Load Standard 7- | SHEET METAL + |
| 007_MAP | Deburr    402 | A9_990-040R PtHdlg Load Standard 24 | ELECTRICAL + |
| 008_MAP | Nutplates | A9_990-051R PtHdlg Misc. Part Hdlg 0 | TUBING AND WELDING + |
| 009_MAP | Chemical | A9_990-052R PtHdlg Misc. Part Hdlg 2 | COMPONENT PAINT AND SEAL + |
| 010_MAP | Fasteners (Generic) | | DETAIL PAINT AND CHEMICAL PROCE |
| 011_MAP | Component Handling | | SUBASSEMBLY + |
| 012_MAP | Misc. | | ASSEMBLY - |
| 020_MAP | Setup etc. | | A1_001_001R Load S Part (0-6 in)(# |
| 021_MAP | NonStruct'l Pt/Tool Hdlg | | A1_001_001R 1 Load S Pt (0-6") Saw |
| 022_MAP | Machining | | A1_001_002R Load L Pt(>24")Lean( |
| 023_MAP | Bonding | | A1_001_002R 1 Jig Load L Pt(>24")( |
| 024_MAP | Fasteners (Specific) | | A1_001_003R Load Detail Pt (clip,brk |
| 025_MAP | Composites | | A1_001_004R Unload Part (#parts) |
| 026_MAP | Electrical | | A1_001_005R Load M Part (7-23 in) |
| 027_MAP | Hydraulic / ESC etc. | | A1_001_006R Monorail use (each) |
| 028_MAP | Test | | A1_001_007R Jib Crane use (each) |
| 029_MAP | Final Finish | | A1_001_008R Reload Small Part (#p |
| A1_PtHandling For Loading Parts | | | A1_001_009R Reload Medium Part ( |
| A2_SecureDevices Securing Devices | | | |
| A3_HolePrep Drill, deburr, csk holes | | | |
| A4_MiscTask Miscellaneous Std data | | | |

Add / Delete / Edit

Add / Remove / Notes

○ Run ○ Setup

Test Template Evaluation

TC Parameters Explicitly Set:

408

Set / Reset / Value

Apply / Done

| | Standards for Plan | | | | |
|---|---|---|---|---|---|
| | Standards | | | | |
| | Task Ctr / Opn | Setup | Opn % | Run | Opn % |
| THE PERSON BELOW SHO WELD APPLI | TC 022 OPN S | 0.0000 0.0000 | (100.00%) | 0.0000 0.0000 | (100.00%) |
| "METAL WOR 1. SAFETY G SAFETY G | TC 308 OPN 10 | 0.1596 0.1596 | (100.00%) | 1.2124 1.2124 | (100.00%) |
| 2. EAR PLUG 3. GLOVES A OR MACH | TC 312 OPN 15 | 0.0037 0.0037 | (100.00%) | 0.0040 0.0040 | (100.00%) |
| "TACK WELD" | TC 308 OPN 20 OPN 25 | 0.0031 0.0015 0.0015 | 50.00% 50.00% | 0.3549 0.1774 0.1774 | 50.00% 50.00% |
| | TC G16 OPN 30 | 0.1120 0.1120 | (100.00%) | 0.0062 0.0062 | (100.00%) |
| | TC 318 OPN 35 | 0.0981 0.0981 | (100.00%) | 0.1130 0.1130 | (100.00%) |
| | TC 643 OPN 40 | 0.0000 0.0000 | ( 50.00%) | 0.0000 0.0000 | ( 50.00%) |

Aluminum Tube Weld R

METHOD AND SYSTEM FOR CREATING AND MANAGING ENGINEERED TIME STANDARDS

TECHNICAL FIELD OF THE INVENTION

The present invention relates generally to the field of product planning and, more particularly, to a method and system for creating and managing engineered time standards.

BACKGROUND OF THE INVENTION

In the course of deriving a producible and affordable design for a complex product, a company's engineers typically conduct a variety of trade studies, which may be very sequential and time-consuming, depending on the product. For example, a multi-million dollar fighter jet may go through numerous trade studies so that the aerospace company building the jet may determine the most cost-effective design based on manufacturing constraints. One of these manufacturing constraints is the time it takes to complete particular tasks.

When the design of the complex product is finalized and the production is in the controlled processes of being produced, the time that it takes to complete the particular tasks continues to be of utmost significance. These times drive the layouts of the manufacturing and assembly of the product. They also enable the determination of the required manning and subsequent balancing of the production and assembly lines. The times may also be used for budgeting and pricing, as well as for scheduling, resource planning, and performance measurement.

SUMMARY OF THE INVENTION

According to one embodiment of the invention, a computerized method for managing time standards includes receiving a set of work instructions associated with the manufacturing of a part and receiving an association of each work instruction of the set of work instructions with one or more of a plurality of time standard templates. Each time standard template describes a task associated with the manufacturing of the part at a task center, including zero or more variables associated with the task, zero or more variables associated with the task center, and an algorithm operable to determine a time value associated with the task. The time value represents a time period to complete the task. The computerized method further includes receiving a change to one of the variables associated with the task, generating a plurality of time standards associated with the work instructions, and storing the time standards in a database.

Embodiments of the invention provide a number of technical advantages. Embodiments of the invention may include all, some, or none of these advantages. In one embodiment, engineered time standards may be continuously improved and updated in a fast, easy and cost-efficient manner. Keeping these time standards updated facilitates better process planning for a manufacturing project, which is important when considering the bottom line. These engineered time standards may be stored on a database that interfaces with other computer-aided process planning and manufacturing tools.

An embodiment of the invention improves tremendously on legacy systems, such as stand-alone MTM-1 based systems. It improves the level of abstraction by parameterization of a standard based on characteristics of the task center, and of the particular task being accomplished, with algorithmic calculation of the final standard which may still retain traceability to underlying MTM data.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 4 is an example Application Sheet Library user interface used in managing engineered time standards according to an embodiment of the invention;

DETAILED DESCRIPTION

Figure 1A:
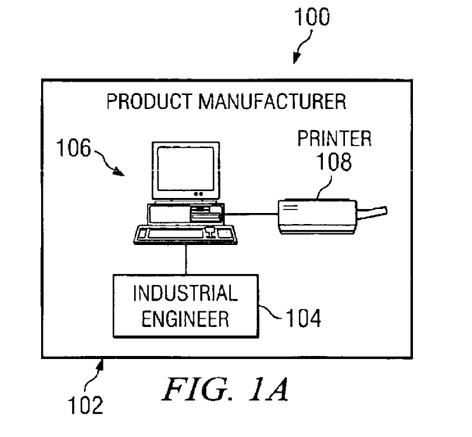
FIG. 1A is a block diagram illustrating a computer-aided process planning system according to one embodiment of the invention.

FIG. 1A is a block diagram illustrating a computer-aided process planning system 100 according to one embodiment of the present invention. System 100 includes a product manufacturer 102 employing an industrial engineer 104 having access to a computer 106 and a printer 108. Product manufacturer 102 may be any company or other suitable entity that designs, engineers, and/or manufactures a product. System 100 is particularly suitable for complex products that have a myriad of parts, sub-assemblies, and/or assemblies. Product manufacturer 102 often has a goal of producing a high quality product in a cost-efficient manner. When dealing with a complex product, product manufacturer 102 typically conducts a variety of manufacturing studies, which may be very sequential and time-consuming. Accordingly, some embodiments of the present invention provide a computerized method and system for creating and/or managing engineered time standards that are utilized in the process planning for a product. The computerized method may be utilized by industrial engineer 104, which may be either an individual employee or a group of employees employed by product manufacturer 102. Industrial engineer 104 utilizes computer 106 which may be any suitable computing device, such as a personal computer, personal digital assistant, or dumb terminal. An example computer utilized by industrial engineer 104 is illustrated below in conjunction with FIG. 1B.

Figure 1B:
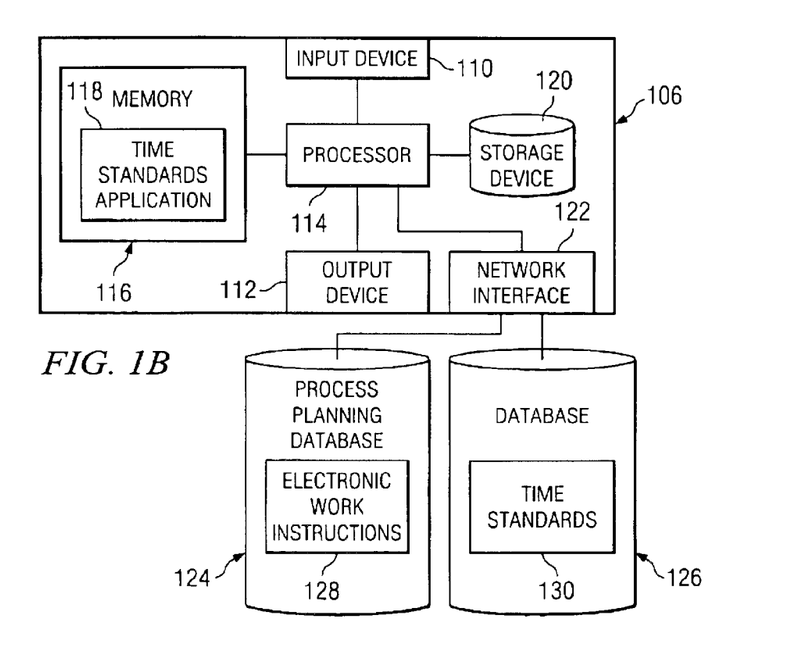
FIG. 1B is a block diagram of a computer of the system of FIG. 1A for use in managing engineered time standards according to one embodiment of the invention.

FIG. 1B is a block diagram of computer 106 for use in creating and/or managing engineered time standards according to one embodiment of the present invention. In the illustrated embodiment, computer 106 includes an input device 110, an output device 112, a processor 114, a memory 116 storing time standards application 118, a storage device 120, and a network interface 122.

Input device 110 is coupled to computer 106 for allowing industrial engineer 104 to utilize time standards application 118. For example, as discussed below, industrial engineer 104 utilizes time standard application 118 through a series of user interfaces associated with time standards application 118. This allows industrial engineer 104 to input, select, and/or manipulate various data and information. In one embodiment, input device 110 is a keyboard; however, input device 110 may take other forms, such as a mouse, a stylus, a scanner, or any combination thereof. Output device 112 is any suitable visual display unit, such as a liquid crystal display or cathode ray tube display, that allows industrial engineer 104 to view time standards or other suitable information as it is being managed. Output device 112 may also be coupled to printer 108 for the purpose of printing any desired information, such as detailed drawings, bills of material, electronic work instructions, time standards, or other suitable information.

Processor 114 comprises any suitable type of processing unit that executes logic. One of the functions of processor 114 is to retrieve time standards application 118 from memory 116 and execute time standards application 118 to allow industrial engineer 104 to create and/or manage time standards. Other functions of time standards application 118 are discussed more fully below. Processor 114 may also control the retrieving and/or storing of information and other suitable data in storage device 120 or other suitable storage device.

Time standards application 118 is a computer program written in any suitable computer language. According to the teachings of some embodiments of the present invention, time standards application 118 is operable to create and/or manage time standards for use by other applications in computer-aided process planning, estimating, purchasing, or other suitable applications, computer-aided or otherwise. Time standards application 118 may perform other suitable functions such as controlling the printing of any various outputs via printer 108. Some functions of time standards application 118 are described below in conjunction with FIGS. 2 through 6.

Memory 116 and storage device 120 may comprise files, databases, or other suitable organizations of volatile or non-volatile memory. Memory 116 and storage device 120 may be random access memory ("RAM"), read only memory ("ROM"), CD-ROM, removable memory devices or any other suitable devices that allow storage and/or retrieval of data. Memory 116 and storage device 120 are interchangeable and may perform the same functions.

Network interface 122 functions to allow computer 106 to communicate with other hardware devices, such as Process Planning database 124 and database 126, in any suitable network, such as a local area network, a wide area network, a virtual private network, or other suitable communications network. In one embodiment, network interface 122 is a network interface card; however, network interface 122 may be other devices suitable for receiving and transmitting signals, such as a modem or a digital subscriber line.

Also illustrated in FIG. 1B is Process Planning database 124 and database 126. Both Process Planning database 124 and database 126 may comprise files, databases, or other suitable organizations of volatile or non-volatile memory. Databases 124 and 126 may be RAM, ROM, CD-ROM, removable memory devices or any other suitable devices that allow storage and/or retrieval of data. Databases 124 and 126 are interchangeable and may perform the same functions. In a particular embodiment of the present invention, both Process Planning database 124 and database 126 are each an Oracle®8i database. In the illustrated embodiment, Process Planning database 124 stores electronic work instructions 128 that may be created in any suitable manner, such as with a suitable computer-aided process planning application. Process Planning database 124 may function to store other suitable data and information. Database 126, in one embodiment, stores one or more time standards 130 that are created by time standards application 118. Database 126 may also store other suitable data and/or information, such as time standard templates, application sheets, master data, and other suitable data.

FIGS. 2 through 5C below illustrate various user interfaces and/or sub-user interfaces associated with time standards application 118. The user interfaces illustrated below in conjunction with FIGS. 2 through 5C are only example user interfaces that may be utilized by time standards application 118. The present invention contemplates more, less, or different user interfaces than those illustrated below.

Figure 2:
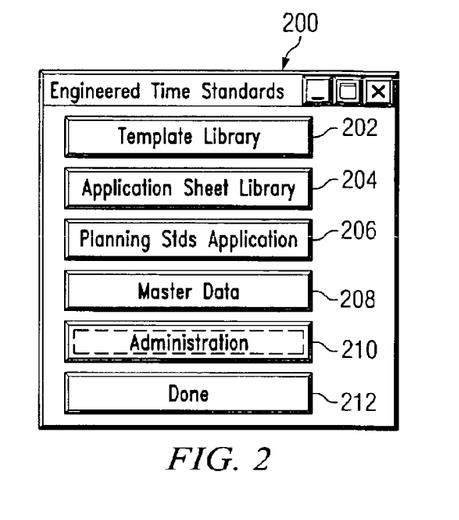
FIG. 2 is an example main Engineered Time Standards user interface used in managing engineered time standards according to an embodiment of the invention.

FIG. 2 is an example Engineered Time Standards main user interface 200 in accordance with an embodiment of the present invention. As illustrated in FIG. 2, Engineered Time Standards user interface 200 includes a "Template Library" button 202, an "Application Sheet Library" button 204, a "Planning Standards Application" button 206, a "Master Data" button 208, an "Administration" button 210, and a "Done" button 212.

Template Library button 202 allows industrial engineer 104 to enter the template library interface of time standards application 118. Functions of the template library mode of time standards application 118 and associated user interfaces are described below are in conjunction with FIGS. 3A through 3D. Generally, the template library mode functions to create and/or manage time standard templates. Time standard templates determine the time value of a particular task during the manufacturing of a product.

Application Sheet Library button 204 allows industrial engineer 104 to enter the application sheet library interface of time standards application 118. Functions of this mode of time standards application 118 and associated user interfaces are described below in conjunction with FIG. 4. Generally, the application sheet library mode of time standards application 118 allows industrial engineer 104 to create and/or edit any number of applications sheets. An application sheet holds a number of time standard templates that are made available to a specific task center or set of task centers. A task center may be considered to be a specific work area on a shop floor.

Planning Standards Application button 206 allows industrial engineer 104 to enter the planning standards application interface of time standards application 118. Functions of this mode of time standards application 118 and associated user interfaces are described below in conjunction with FIGS. 5A–5C. Generally, the planning standards application mode of time standards application 118 functions to associate time standard templates to a set of electronic work instructions, and from them, to calculate, display and manage time standard values for that set of instructions. Time standard templates may further be specialized by variables that are specific to actions described by the electronic work instructions to recalculate the time value for that particular task related to the time standard templates.

Master Data button 208 allows industrial engineer 104 or other suitable employee of product manufacturer 102 to manage categories, keywords, and/or parameters of time standards application 118 via any suitable number of user interfaces. Other functions may be associated with the master data mode of time standards application 118. Administration button 210 allows industrial engineer 104 or other suitable employee of product manufacturer 102 to manage such things as user permissions. Other suitable administration functions may be enabled by any suitable number of user interfaces associated with the selection of administration button 210. Done button 212 functions to allow industrial engineer 104 to exit time standards application 118 when he or she is finished performing his or her work.

Figure 3A:
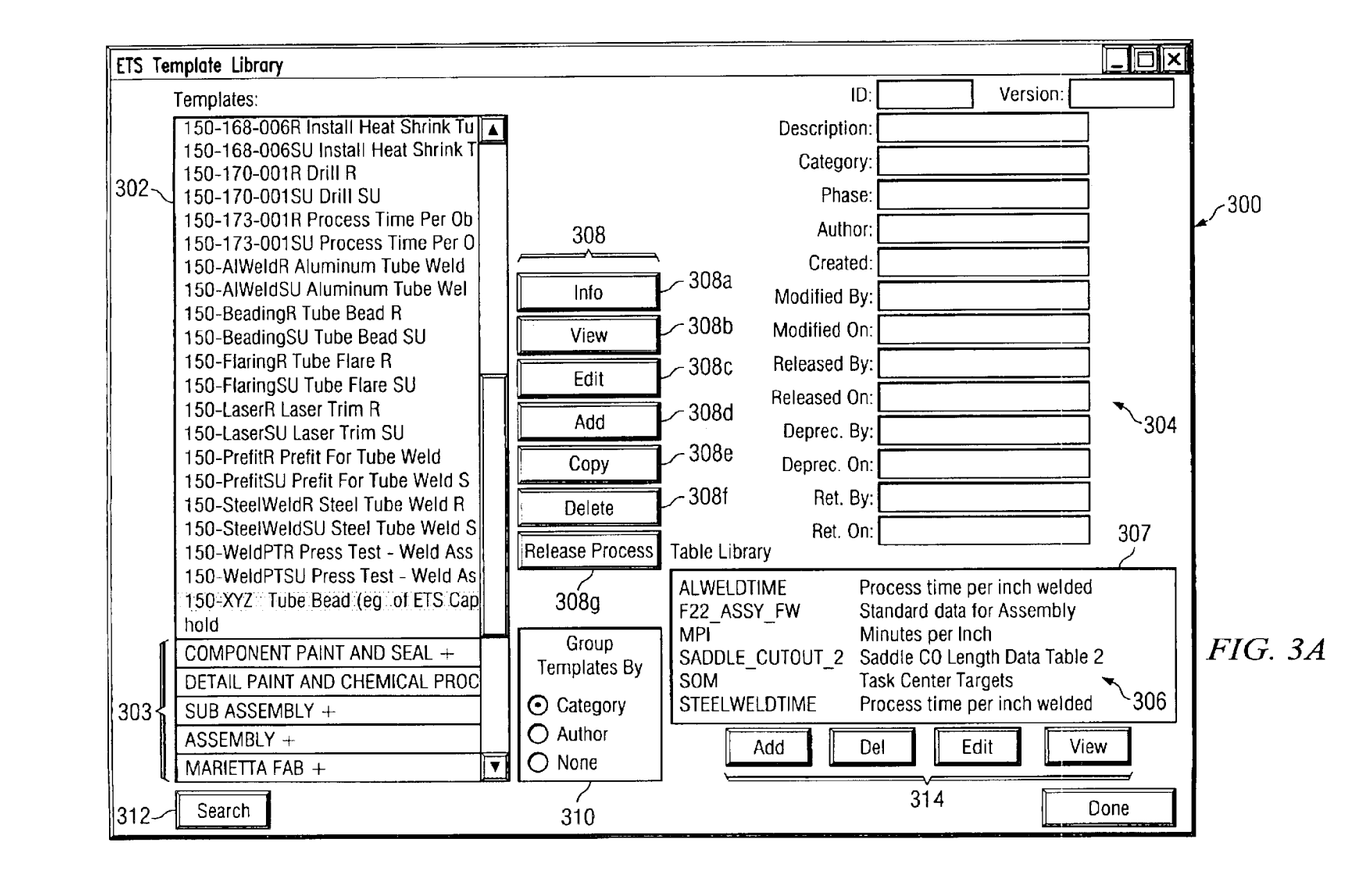
FIG. 3A is an example Template Library user interface used in managing engineered time standards according to an embodiment of the invention.

FIG. 3A is an example of a Template Library user interface 300 used in creating and/or managing time standard templates according to an embodiment of the present invention. In illustrated embodiment, interface 300 includes a "Templates" section 302, a template information section 304, a "Table Library" section 306, a plurality of buttons 308, a presentation mode section 310, and a "Search" button 312.

Templates section 302 functions to display one or more time standard templates. These time standard templates may be presented in templates section 302 in any suitable manner. However, by utilizing presentation mode section 310, time standard templates may be grouped by category, author, or be presented with no particular grouping. In the illustrated embodiment, the time standard templates are grouped by categories, as denoted by reference numeral 303. Any particular category may be expanded by clicking on the "plus" next to a particular category (or the category itself in some embodiments).

By expanding a category and selecting a particular time standard template, buttons 308 are enabled. An "Info" button 308a may be utilized to view a particular version of a time standard template. For example, a left click of Info button 308a may allow a current version of a time standard template to be viewed, and a right click of Info button 308 may allow the viewing of any available version. Version control is described in further detail below. A "View" button 308b may be utilized to inspect the time standard template without putting the template into a work-in-progress ("WIP") mode. In addition, View button 308b is one way to see templates that have been released, superceded, deprecated or retired, all of which are displayed as "read-only." It may also view the current WIP version, if one exists, in a "read-only" mode. An "Edit" button 308c allows a particular time standard template to be edited. Edit button 308c views the current WIP version in an editable mode. If there is no current WIP version, then it creates one by making a copy of the most recently released version. Details of editing a time standard template are described below in conjunction with FIGS. 3C and 3D. An "Add" button 308d allows a new time standard template to be added. Although not illustrated, an "Add" user interface is used, in one embodiment, to enter an ID, description, and category for the new time standard template. A "Copy" button 308e allows a highlighted time standard template to be copied to create a new time standard template. A "Delete" button 308f allows a highlighted time standard template to be deleted. Deleting a time standard template, in one embodiment, eliminates all versions of the time standard template including a WIP template. A "Release Process" button 308g may be utilized to control various versions of a time standard template.

In one embodiment, a selection of Release Process button 308g causes a selection menu to pop-up and allow industrial engineer 104 to select an option. These options include a "Release" selection, to release the current WIP template, a "Deprecate" selection, to make the template unavailable to new EWI (electronic work instructions), a "Retire" selection, to make the template unavailable to all EWI, and a "Re-release" selection, to restore a time standard template's released status. When the WIP version of the time standard template is released, the previously released version of the template enters a "Superceded" state. When a new template is created it starts in a WIP state. When a previously released template is edited, a copy of the template is created in a WIP state. The present invention contemplates less, more, or different options when selecting release process button 308g. The number and/or type of options may be controlled by legal and/or governmental standards.

Template information section 304 allows industrial engineer 104 to view the version history and status of a particular time standard template.

Search button 312 allows industrial engineer 104 to either search for a particular time standard template or to associate keywords with a particular time standard template. The present invention contemplates any suitable search methodology for time standard templates.

Table Library section 306 allows industrial engineer 104 to create and/or manage any suitable tables for use in conjunction with creating and/or managing time standard templates. Generally, a table allows industrial engineer 104 to access particular data. This data is typically stored on storage device 120 of computer 106, but may also be stored in database 126. In the illustrated embodiment, six different tables are illustrated in window 307. A plurality of buttons 314 may be used to add, delete, edit, or view a particular table. Further details regarding Table Library section 306 are described below in FIG. 3B.

Figure 3B:
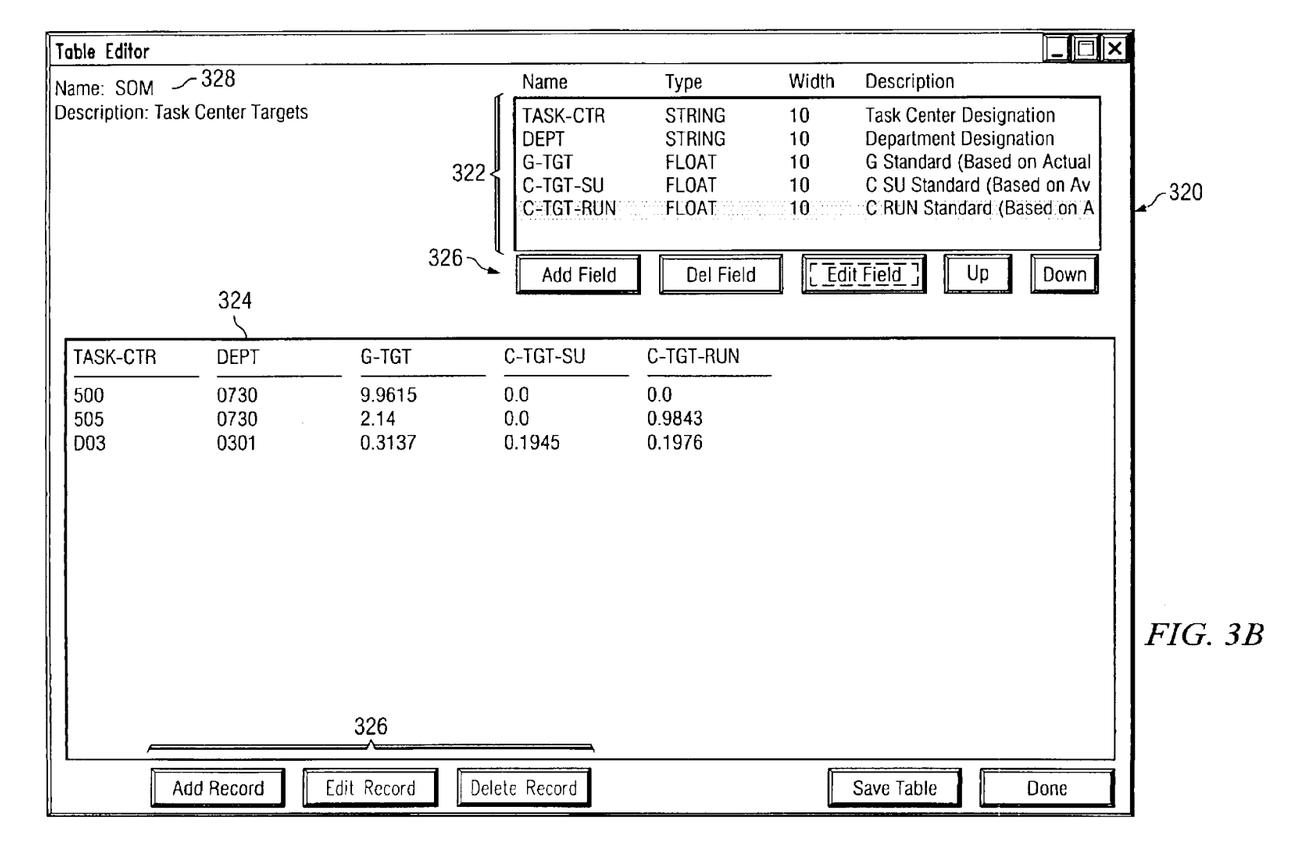
FIG. 3B is an example Table Editor sub-user interface used in managing engineered time standards according to an embodiment of the invention.

FIG. 3B is an example Table Editor sub-user interface 320 according to one embodiment of the present invention. Interface 320 includes a field definition section 322 and a table data section 324. This data may be organized in any suitable manner, such as records and fields. These records and fields may be added, edited, or deleted using buttons 326. Any particular table may be represented by a name 328. This name 328 may allow the table to be called in a particular algorithm, which is described in further detail below.

Figure 3C:
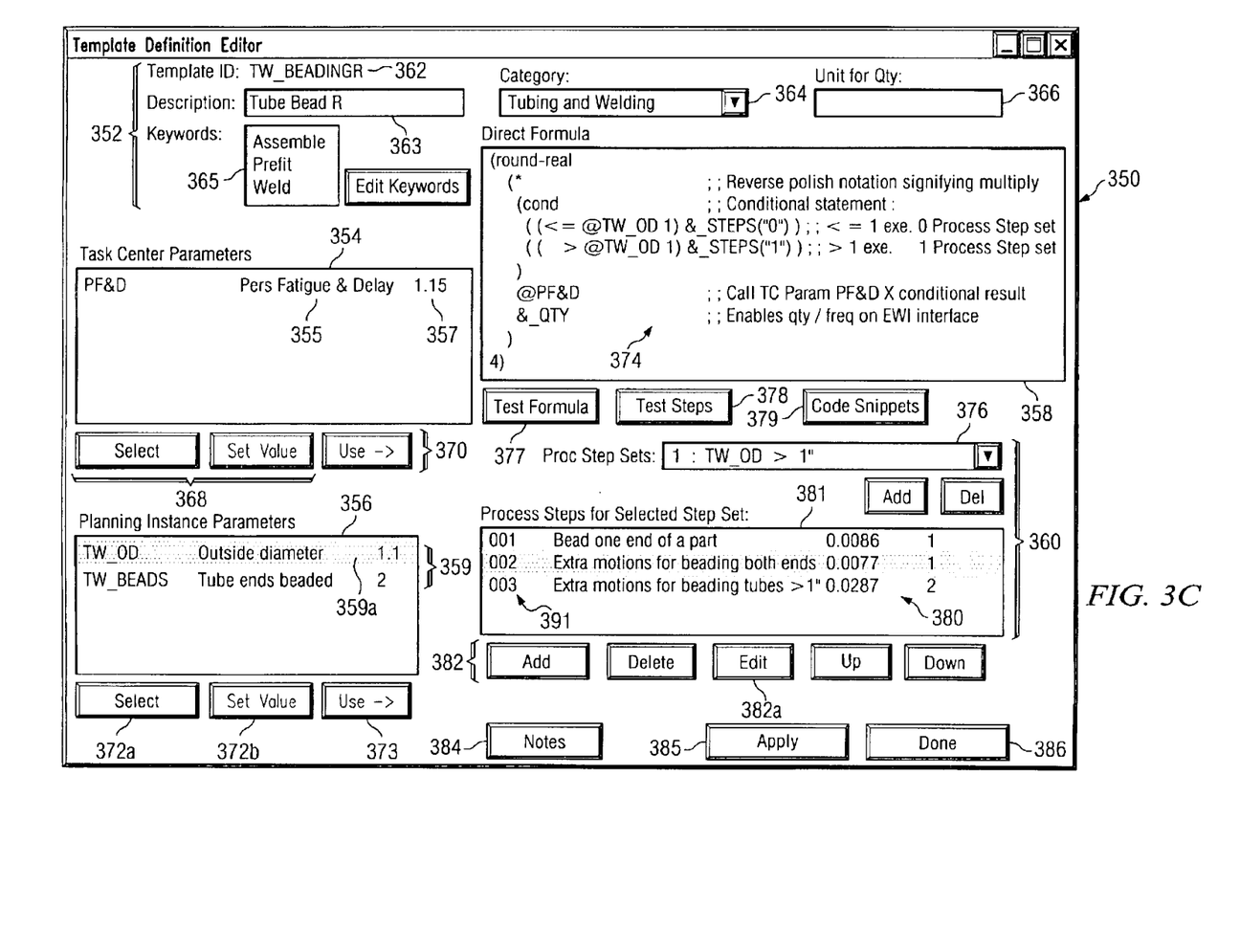
FIG. 3C is an example Template Definition Editor sub-user interface used in managing engineered time standards according to an embodiment of the invention.

As described above, selecting Edit button 308c in Template Library interface 300 opens a Template Definition Editor interface 350, as shown in FIG. 3C. Referring to FIG. 3C, interface 350 includes a general template information section 352, a "Task Center Parameters" section 354, a "Planning Instance Parameters" section 356, a "Direct Formula" section 358, and a "Process Step Sets" section 360. Generally, interface 350 allows industrial engineer 104 to define a particular time standard template. As described above, a particular time standard template is associated with a particular task used in manufacturing of a part of a product. For example, in the illustrated embodiment, the particular task associated with the time standard template shown relates to welding of a tube.

General template information section 352 includes a template ID 362, which identifies the time standard template by name or other suitable identification, a "Description" section 363 that generally describes the time standard template, a "Category" section 364 which identifies the category of the time standard template, a "Keywords" section 365, which associates particular keywords with the time standard template to facilitate searching. When applied to EWI, the time represented by a template is multiplied by the quantity or frequency of that task which would occur in the execution of those instructions. The "Unit for Quantity" section 366 allows the industrial engineer 104 to define a unit by which that quantity or frequency is measured.

Task Center Parameters section 354 includes variables intrinsic to a given task center. As described above, a task center is a particular work area out on the floor of a manufacturing shop. For example, as illustrated in FIG. 3C, a personal fatigue and delay (PF&D) variable 355 is illustrated in Task Center Parameters section 354. PF&D variable 355 has a value of 1.15, as denoted by reference numeral 357. This number is a default value for this parameter, which may, in general, be overridden by a value related to a specific task center when the template is used as part of an application sheet, as described below. If not overridden, this value, 1.15, would be utilized in the determination of the time value for this particular task. Any suitable variable may be included in Task Center Parameters section 354, such as machine allowances or other suitable task parameters. A pair of buttons 368 may be utilized to select and set the value of a particular task center parameter. A "Use" button 370 may be utilized to "push" a particular variable into an algorithm, as described in further detail below.

Planning Instance Parameters section 356 includes variables intrinsic to a given task. Although only two variables 359 are illustrated in Planning Instance Parameters section 356, the present invention contemplates any suitable number of variables to be shown in Planning Instance Parameters section 356. Any particular variable within Planning Instance Parameters section 356 may or may not be a dimensionless parameter. In the example shown in FIG. 3C, an outside diameter variable 359a includes a value of 1.1, which indicates the outside diameter of a particular tube being welded in this task center is 1.1 inches. This value is used by an algorithm 374 within direct formula section 358. A "Use" button 373 may be utilized to "push" a particular variable 359 into algorithm 374, which is described in greater detail below. "Select" button 372a is utilized to select parameters from a master list onto the template being edited. "Set Value" button 372b is utilized to set the default value of a particular variable (parameter) 359.

Direct Formula section 358 contains one or more algorithms 374 for determining the time value of a particular task associated with the time standard template being edited. Any suitable algorithm may be utilized to determine the time value, and algorithm 374 may be written in any suitable computer language. In one embodiment, algorithm 374 makes calls to task center parameters section 354, planning instance parameters section 356, as well as potential calls to any data residing in tables that were created using table library section 306 (FIG. 3A), as described above. Algorithm 374 may also make calls to one or any number of process step sets 376 associated with process step sets section 360. Direct Formula section 358 also includes a "Test Formula" button 377 that functions to test algorithm 374 to determine whether or not it is working properly. A "Test Steps" button 378 allows any individual process step set 376 to be tested. A "Code Snippets" button 379 may act as a help menu to guide industrial engineer 104 in developing algorithm 374 or process step sets 376.

Process Step Sets section 360 includes one or any number of process step sets that may be utilized by algorithm 374. Process step sets may be thought of analogously to "subroutines" of a program (or more accurately "functions," since they return a value), but they have particular semantics that distinguish them from ordinary subroutines. For example, they represent only a time value, not a general calculation of arbitrary type. Furthermore, they represent discretized tasks occurring in a particular order (each representing a particular time value). The time values of individual steps may include algorithmic calculations for "unit time"—the time to perform the individual task—and "quantity"—the number of repetitions of the task, both of which may depend on the template's parameters as well as the overall quantity value associated on the planning interface. The time values calculated for the individual steps are directly summed to produce the time value of the step set. Any particular process step set 376 may include one or more process steps 380 that are shown in a section 381. These process steps 380 may be added, deleted, or otherwise edited using one or more buttons 382. Selecting an "Edit" button 382a prompts industrial engineer 104 with a Edit Process Step interface 390, as described in detail below in conjunction with FIG. 3D.

Template Definition Editor interface 350 also includes a "Notes" button 384 that allows industrial engineer 104 to include any suitable notes associated with the particular time standards template being edited. These notes may take any suitable form, such as a text file, an image file, an audio file, or a video file. Interface 350 also includes an "Apply" button 385 to allow the time standard template to be incorporated when the creation and/or editing of the time standard template is completed. A "Done" button 386 allows industrial engineer 104 to exit Template Definition Editor interface 350.

Figure 3D:
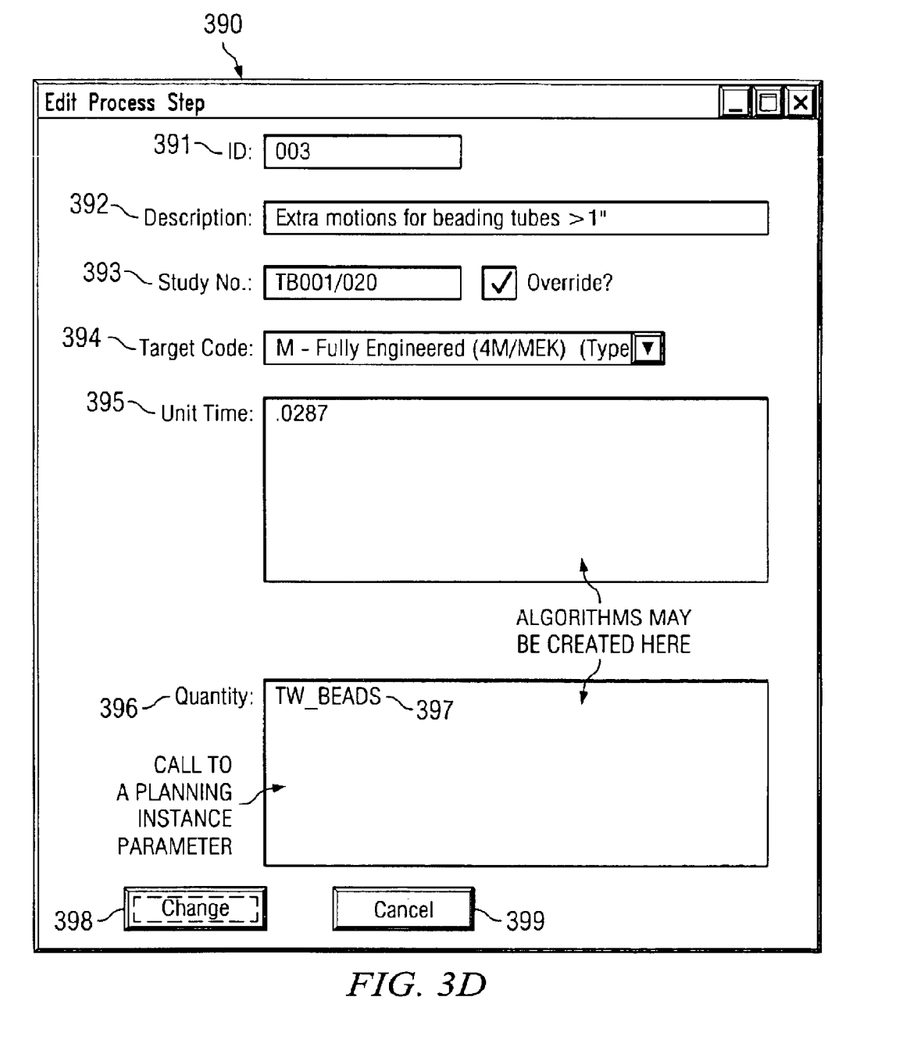
FIG. 3D is an example Edit Process Step sub-user interface used in managing engineered time standards according to an embodiment of the invention.

FIG. 3D is an example Edit Process Step interface 390 in accordance with an embodiment of the present invention. Interface 390 includes an "ID" section 391, a "Description" section 392, a "Study Number" section 393, a "Target Code" section 394, a "Unit Time" section 395, and a "Quantity" section 396. ID section 391 merely identifies the process step, Description section 392 merely generally describes the process step, Study Number section 393 links the particular process step to a particular study number, and Target Code section 394 links the particular process step to a particular target code. A target code refers to the type of standard; e.g., a Task Center average or a fully engineered one. Unit Time section 395 includes a time value associated with a particular process step and Quantity section 396 includes a variable 397 that allows the process step to be called by either algorithm 374 and/or process step set 376. Both Unit Time section 395 and Quantity section 396 may include algorithms instead of discrete values or parameters. A "Change" button 398 functions to allow industrial engineer 104 to change the particular process step and a "Cancel" button 399 exits the Edit Process Step interface 390.

FIG. 4 is an example Application Sheet Library user interface 400 according to one embodiment of the present invention. Interface 400 allows industrial engineer 104 to enter the application sheet library mode of time standards application 118 in order to assign time standard templates to application sheets. In the illustrated embodiment, interface 400 include an "Application Sheets" section 402, a "Template Library" section 404, an "Assigned Templates" section 406, and a "Task Center Parameters Explicitly Set" section 408. Application Sheets section 402 displays one or more application sheets. As described above, an application sheet holds one or more time standard templates that are made available to a specific task center or set of task centers. A particular application sheet may be added by using an "Add" button 410, deleted using a "Delete" button 412, or edited using an "Edit" button 414. By selecting either Add button 410 or Edit button 414 a user interface (not shown) is displayed in order to allow industrial engineer 104 to enter the identifying information for the application sheet in addition to applying the application sheet to one or more task centers.

Template Library section 404 is similar to template library section 302 of template library interface 300 (FIG. 3A). In other words, Template Library section 404 display one or more time standard templates (that have been released and not deprecated nor retired) so that industrial engineer 104 may assign a particular time standard template to a particular application sheet. The assigned templates are illustrated in Assigned Templates section 406. Any suitable method may be used to assign a time standard template to an application sheet, such as double clicking on a time standard template or highlighting a time standard template and clicking an "Add" button 416 associated with Assigned Templates section 406. Assigned templates may also be removed by the use of a remove button 417 associated with Assigned Templates section 406.

Task Center Parameters Explicitly Set section 408 is similar to task center parameters section 354 of Template Definition Editor interface 350 (FIG. 3C). In other words, Task Center Parameters Explicitly Set section 408 will display any overridden parameters associated with a particular task center to allow industrial engineer 104 to set or reset the value for that parameter. Although a particular parameter is not illustrated in section 408 (which means the default values are being used), buttons 409 may be utilized to set or reset a value of a task center parameter.

Application Sheet Library interface 400 also includes a "Notes" button 420 that allows notes to be added to a particular application sheet. As described above, these notes may be any suitable notes such as a text file, an image file, an audio file, or a video file. When the assigning of time standard templates to application sheets, an "Apply" button 422 may be selected to incorporate the assignments. A "Done" button 424 may be selected to exit the Application Sheet Library mode of time standard application 118.

Figure 5A:
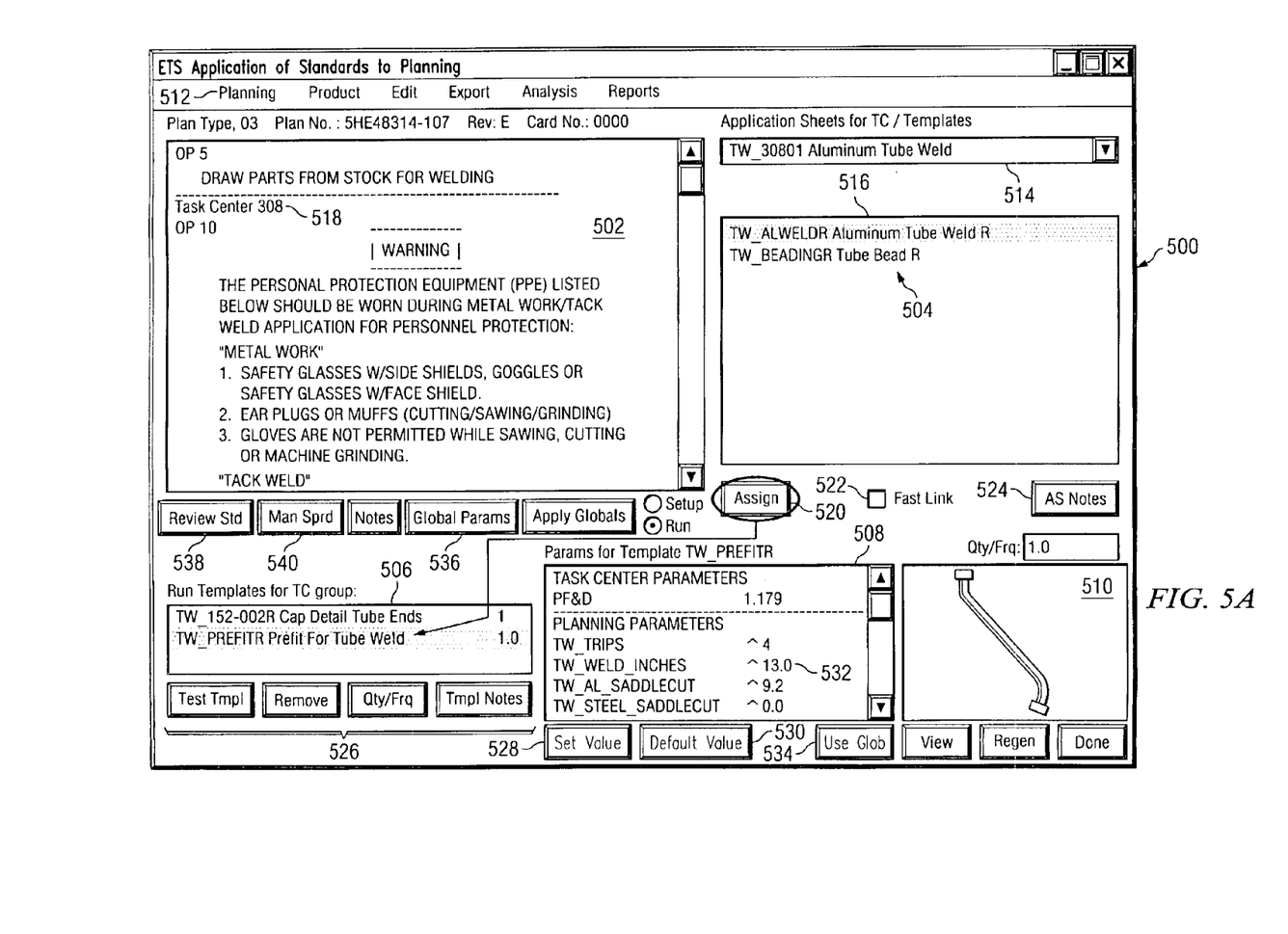
FIG. 5A is an example Application of Standards to Planning user interface used in managing engineered time standards according to an embodiment of the invention.

FIG. 5A is an example Application of Standards to Planning interface 500 according to an embodiment of the present invention. Interface 500 is the main user interface for the planning standards application mode of time standards application 118. As described above, the planning standards application mode allows time standard templates to be associated with a set of electronic work instructions and applied to a planned task accomplished in a particular set of task centers. This mode may also facilitate the specialization of a time standard template based on variables specific to the actions described by the electronic work instructions.

In illustrated embodiment, interface 500 includes an electronic work instruction section 502, an "Application Sheets/Templates" section 504, a "Templates for TC Group" section 506, a "Parameters for Template" section 508, and an image section 510. Interface 500 also includes a plurality of drop down menus and buttons that are described in conjunction with the descriptions of individual sections 502 through 510.

Electronic work instruction section 502 displays electronic work instructions consisting of operations grouped by task centers for a particular part or assembly plan. In other words, electronic work instructions are grouped into sets of contiguous operations that take place in the same task center, and there may be multiple such groups in a set of electronic work instructions. These groups are referred to herein as "task center planning groups." A task center planning group may have one or more electronic work instructions. In one embodiment, the electronic work instructions may be downloaded from Process Planning database 124 (FIG. 1). However, electronic work instructions may also be imported or downloaded from other suitable locations, such as database 126 or other suitable storage location. Any suitable method may be used to import or download electronic work instructions. In one embodiment, a "Planning" drop-down menu 512 may be utilized to select a particular part number. Although not illustrated, one or more user interfaces may be utilized to import the electronic work instructions. Typically, electronic work instructions, such as electronic work instructions 128 stored in Process Planning database 124 (FIG. 1B) are developed by a suitable computer-aided process planning application. However, the electronic work instructions may also be manually input by industrial engineer 104.

Application Sheets/Templates section 504 includes an application sheets section 514 and a template section 516. Application sheets section 514 displays the application sheets that are associated with the particular task center that the electronic work instructions are associated with. In other words, the applications sheets displayed correspond to the task center that one such selected group (i.e., task center planning group) of the electronic work instructions is associated with. For example, as illustrated in FIG. 5A, the application sheets associated with a task center 308 (as denoted by reference numeral 518) are displayed in application sheets section 514. Accordingly, the time standard templates associated with a particular application sheet are displayed in templates section 516. The time standard templates shown in template section 516 were applied to that particular application sheet as described above in conjunction with FIG. 4. These templates may now be selected and associated with the particular electronic work instructions in electronic work instruction section 502 by utilizing an "Assign" button 520. Clicking on Assign button 520 automatically displays that particular time standard template in Templates for TC Group section 506. If a large number of templates are assigned to a particular application sheet then a "Fast link" enable button 522 may be utilized to click the particular time standard template so that they are automatically displayed in Templates for TC Group section 506. An "AS Notes" button 524 may be used to view notes for a particular application sheet.

Templates for TC Group section 506 displays the time standard templates that are assigned to the particular set of work instructions. Highlighting a particular time standard template in Templates for TC Group section 506 displays planning parameters associated with that particular template in Parameters for Template section 508. Also displayed in Parameters for Template section 508 are task center parameters associated with the template, and specific to the particular task center of the electronic work instructions. Referring back to Templates for TC Group section 506 a plurality of buttons 526 may be utilized to test, remove or otherwise and/or manage the time standard templates tagged to the particular electronic work instructions.

Parameters for Template section 508, in addition to displaying the associated parameters for the task center and for the particular time standard template, allows the planning parameters to be changed by using a "Set Value" button 528 or a "Default" value button 530, or by automated logic based on aspects of the EWI. For example, as denoted by reference numeral 532, if the length of the weld inches changes from 13.0 to 18.6 inches then Set Value button 528 may be selected to change that value. This then results in a change to the time value calculated for this particular task. However, it does not change the defaults of the particular time standard template.

A "Use Global" button 534 allows industrial engineer 104 to use the global parameters associated with a particular time standard template. These global parameters may be set by using a "Global Parameters" button 536. Global parameters are associated to a particular plan (i.e. set of EWI), and may be used across the planning parameters from all the templates assigned to that plan, allowing a single common setting to drive multiple parameters.

Figure 5B:
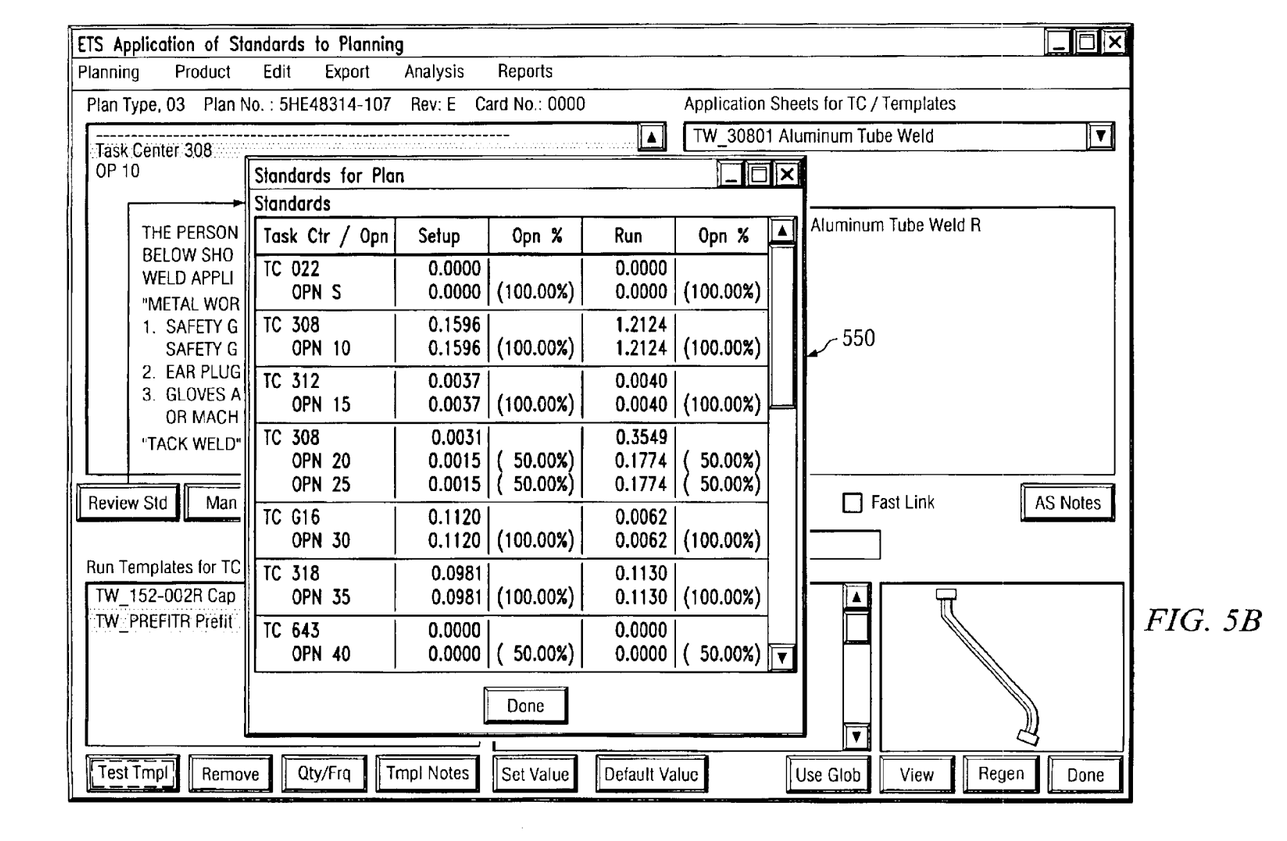
FIG. 5B is an example Standards for Plan sub-user interface used in managing engineered time standards according to an embodiment of the invention.

A "Review Standard" button 538 allows industrial engineer 104 to review all of the standards associated with the electronic work instructions displayed in electronic work instructions section 502. This is described in further detail below in conjunction with FIG. 5B. Referring to FIG. 5B, an example "Standards for Plan" user interface 550 according to one embodiment of the present invention is illustrated. Interface 550 displays all of the task centers and operations that a particular part goes through during manufacturing and their corresponding "setup" and "Run" time values, which are described in further detail below. Any suitable manner of display may be utilized. In illustrated embodiment, the display is in a tabular format for ease of use. A "Setup" portion of a task is something that is performed for a batch of parts, whereas a "Run" portion of a task is something that is performed for each particular part. In other words, the Setup covers what is done to begin processing multiple parts, and Run is anything done per part. For example, if you have a batch of tubes to be welded, then the Setup portion may be pulling the tubes from a parts bin and accounting for time to set up a particular tube in a jig. A Run portion of tubes to be welded is the time it takes to weld each particular tube. This is just one example.

Image section 510 displays a three-dimensional faceted representation of the part or assembly associated with the electronic work instructions. This is to help industrial engineer 104 to view and measure the actual part or assembly and make educated decisions regarding the time standards.

Figure 5C:
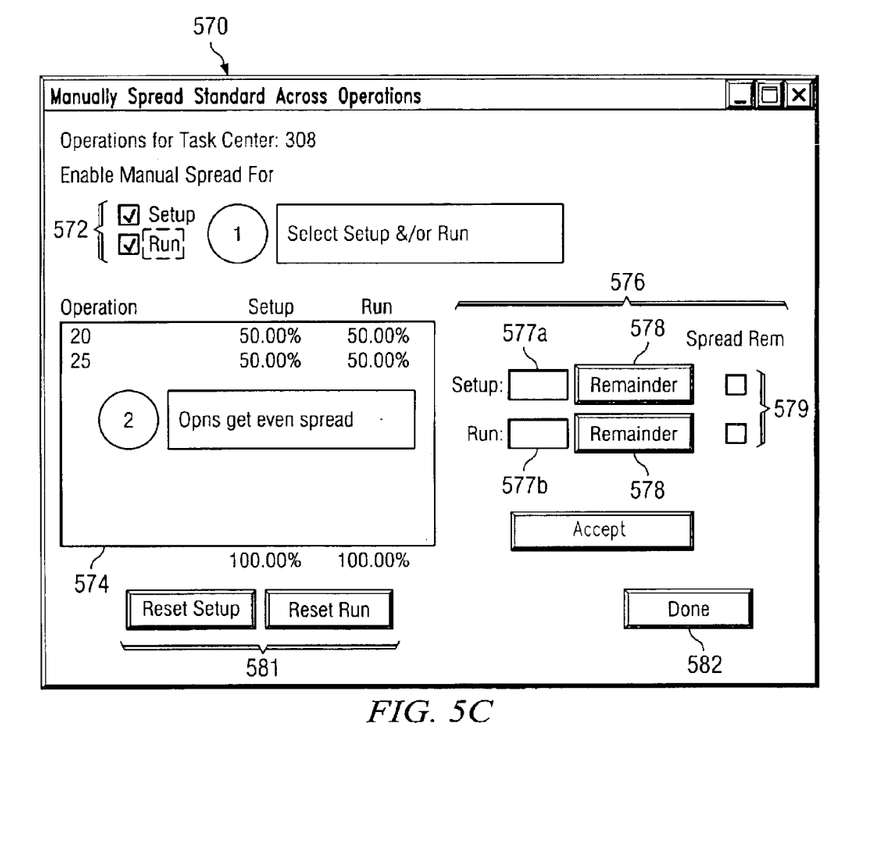
FIG. 5C is an example Manually Spread Standard Across Operations sub-user interface used in managing engineered time standards according to an embodiment of the invention.

A "Manual Spread" button 540 gives industrial engineer 104 the option to split up the total task center Setup and Run time values between the operations in that task center. An example interface that is displayed when Manual Spread button 540 is selected is shown below in conjunction with FIG. 5C. Referring to FIG. 5C, a "Manually Spread Standard Across Operations" interface 570 is illustrated. Interface 570 includes check boxes 572 to allow industrial engineer to select either "Setup" or "Run," an "Operation" section 574 that displays a particular operation and the percentage that is allocated to the Setup and Run portions, and an allocation section 576 that allows industrial engineer 104 to determine the allocation of the Setup and Run portions for a particular operation. For example, when a particular operation is selected in Operation section 574, then the "Setup" and "Run" boxes 577a and 577b may be utilized along with "Remainder" buttons 578 and "Spread Remainder" selection boxes 579 to allocate the percentages of setup and run standards between the operations of a particular task center planning group. "Reset" buttons 581 may be utilized to reset the Setup or Run portions. It should be understood that the spread is across the operations for each of the setup and run standards. A "Done" button 582 exits the interface 570.

Figure 6:
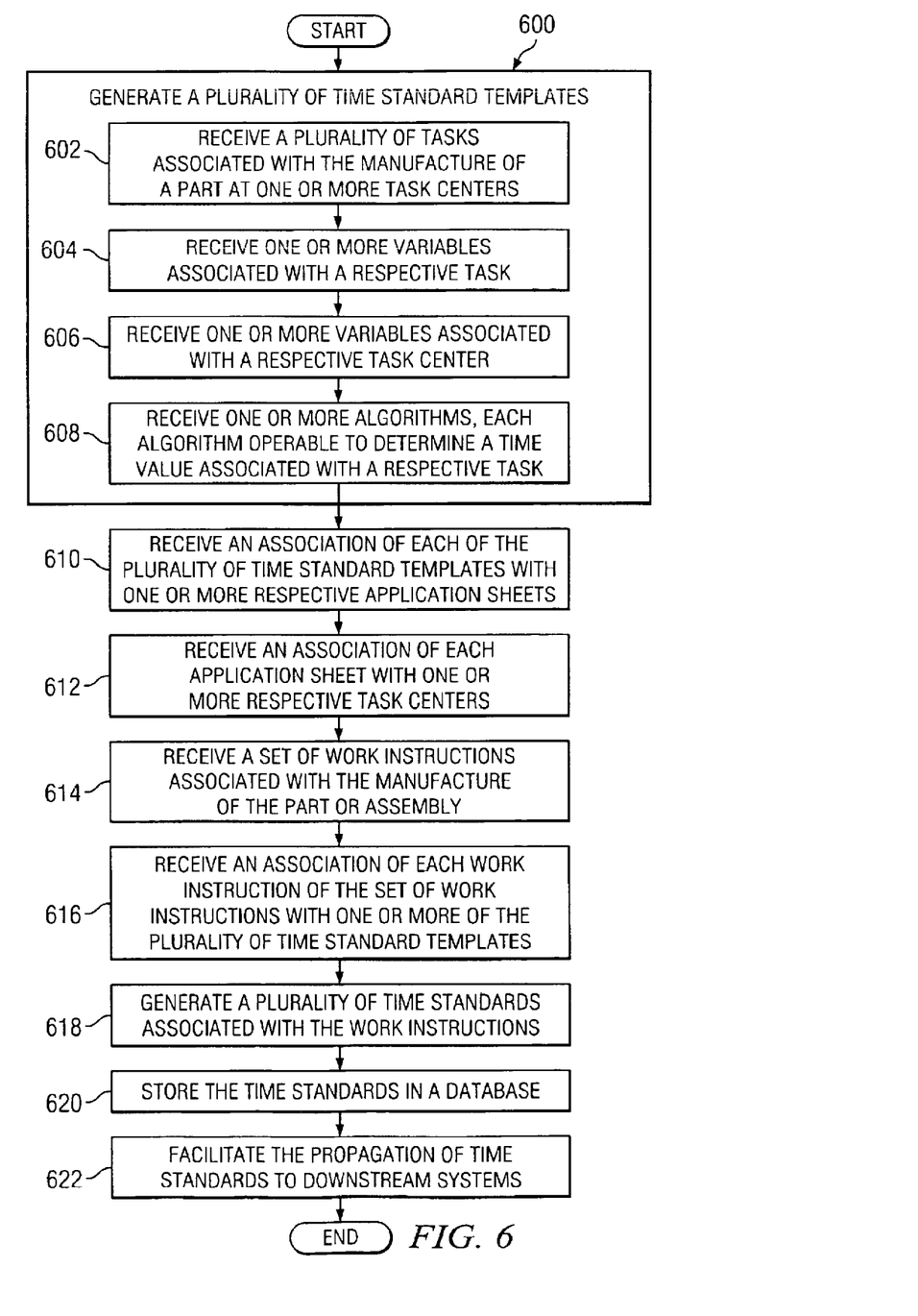
FIG. 6 is a flowchart illustrating a computerized method for managing time standards according to one embodiment of the invention.

FIG. 6 is a flowchart illustrating a computerized method for creating and/or managing time standards according to one embodiment of the present invention. The example computerized method outlined in FIG. 6 may be executed by time standards application 118 on computer 106 with the interaction of industrial engineer 104 or through other suitable techniques.

The method begins at step 600 where a plurality of time standard templates are generated. As described above, a time standard template is used to calculate how long a particular task takes during the manufacturing of a part or assembly. In the example computerized method illustrated in FIG. 6, generating a plurality of time standard templates includes the steps outlined in step 602 through 608. At step 608, a plurality of tasks associated with the manufacture of a part or assembly at one or more task centers is received by a computer, such as computer 106. One or more variables associated with a respective task is received by computer 106, as denoted by step 604. These variables may take any suitable form, such as dimensions, frequencies, or other suitable parameters. One or more variables associated with a respective task center is received by computer 106, as denoted by step 606. These variables are unique to a specific task center that is being used for carrying out the task and may include such things as a personal fatigue and delay factor, a machine allowance, or other suitable task center parameters. One or more algorithms are received by computer 106 at step 608. Each algorithm is operable to determine a time value associated with a respective task. In other words, the time it takes to complete that particular task is determined by that algorithm. As described above, that algorithm may have one or more process step sets, and may make calls to the variables associated with the respective tasks or the variables associated with a respective task center, or other suitable tables that are developed as described above. After the plurality of time standard templates are generated at step 600, the computerized method outline in FIG. 6 continues at step 610.

At step 610, an association of each of the plurality of time standard templates with one or more respective application sheets is received by computer 106. Each application sheet is associated with one or more respective task centers and this association is received by computer 106 at step 612. A set of electronic work instructions associated with the manufacturing of a part or assembly is received by computer 106 at step 614. As described above, these electronic work instructions may be downloaded or otherwise retrieved from a database, such as Process Planning database 124 or other suitable database. These electronic work instructions are typically created by a computer-aided process planning application or other suitable application. An association of each work instruction of the set of work instructions with one or more of the plurality of time standard templates is received by computer 106 at step 616. The plurality of time standards associated with the work instructions are generated at step 618. This may include industrial engineer 104 changing certain variables regarding a respective task and may include an allocation of the time value for setup and run associated with a particular task center grouping of the EWI across the operations (or steps) contained in that task center grouping. In any event, the generated time standards are stored in a database, as denoted by step 620. As denoted by step 622, the propagation of time standard templates to downstream systems is facilitated. These downstream systems may be any suitable systems, such as a Shop Floor Management system. This then ends the example method outlined in FIG. 6.

As described above, time standards application 118 may have any suitable number of functions. Some of the functions not described above in conjunction with FIGS. 2–6 are a cut-and-paste capability from other applications, such as Excel, an error trapping capability to help eliminate errors in time standards application 118, and a numbering schema capability to help industrial engineer 104 to number time standard templates properly. There may also be any number of help menus or functions to aid industrial engineer 104 in developing algorithms for the determining of the time values for a particular task.

Although embodiments of the invention and their advantages are described in detail, a person skilled in the art could make various alterations, additions, and omissions without departing from the spirit and scope of the present invention as defined by the appended claims.

What is claimed is:

1. A computerized method for managing time standards, comprising:
   generating, by a computer, a plurality of time standard templates, comprising:
      receiving, at the computer, a plurality of tasks associated with the manufacturing of a part at one or more task centers;
      receiving one or more variables associated with a respective task;
      receiving one or more variables associated with a respective task center; and
      receiving one or more algorithms, each algorithm operable to determine a time value associated with a respective task, the time value representing a time period to complete the respective task;
   receiving an association of each of the plurality of time standard templates with one or more respective application sheets;
   receiving an association of each application sheet with one or more respective task centers;
   receiving a set of work instructions associated with the manufacturing of the part;
   receiving an association of a task center planning group of the set of work instructions with one or more of the plurality of time standard templates;
   generating a plurality of time standards associated with each task center planning group; and
   storing the time standards in a memory.

2. The computerized method of claim 1, further comprising receiving an organization of the time standard templates by a plurality of categories.

3. The computerized method of claim 1, further comprising storing a plurality of versions of each time standard template in the database.

4. The computerized method of claim 1, further comprising receiving one or more keywords associated with a respective time standard template to facilitate searching capability.

5. The computerized method of claim 1, further comprising receiving one or more note files associated with a respective time standard template, each note file selected from the group consisting of a text file, an image file, an audio file, and a video file.

6. The computerized method of claim 1, further comprising receiving one or more tables, each table containing data configured to be called by a respective algorithm when determining the time value.

7. The computerized method of claim 1, wherein at least one of the algorithms includes zero or more process step sets.

8. The computerized method of claim 1, further comprising:
   receiving a change to one of the variables associated with a respective task after the step of receiving an association of a task center planning group of the set of work instructions with one or more of the plurality of time standard templates;
   generating a new time standard based on the changed variable; and
   storing the new time standard in the database.

9. The computerized method of claim 8, further comprising updating the changed variable across all time standard templates that contain the variable.

10. The computerized method of claim 1, further comprising receiving an allocation of the time value associated with a respective task between a setup portion and a run portion of the respective task.

11. A computerized method for managing time standards, comprising:
    receiving, at a computer, a set of work instructions associated with the manufacturing of a part;
    receiving an association of a task center planning group of the set of work instructions with one or more of a plurality of time standard templates, each time standard template comprising:
       a task associated with the manufacturing of the part at a task center;
       one or more variables associated with the task;
       one or more variables associated with the task center; and
       an algorithm operable to determine a time value associated with the task, the time value representing a time period to complete the task;
    receiving a change to one of the variables associated with the task;
    generating a plurality of time standards associated with each task center planning group; and
    storing the time standards in a memory.

12. The computerized method of claim 11, further comprising receiving a global variable corresponding to a variable common to one or more time standard templates associated with the electronic work instructions that is used to change a value used in determining all time standard templates associated with those particular electronic work instructions that contain the common variable.

13. The computerized method of claim 11, further comprising:
    generating a plurality of time standard templates;
    receiving an association of each of the plurality of time standard templates with one or more respective application sheets; and
    receiving an association of each application sheet with one or more respective task centers.

14. The computerized method of claim 11, further comprising receiving one or more tables, each table containing data configured to be called by the algorithm when determining the time value.

15. The computerized method of claim 11, wherein the algorithm includes zero or more process step sets.

16. The computerized method of claim 11, further comprising receiving an allocation of the time value associated with the task between a setup portion and a run portion of the task.

17. The computerized method of claim 11, further comprising receiving zero or more note files associated with the time standard template, each note file selected from the group consisting of a text file, an image file, an audio file, and a video file.

18. A system for managing time standards, comprising:
a computer-readable medium;
a computer program stored on the computer-readable medium operable to:
generate a plurality of time standard templates by:
receiving a plurality of tasks associated with the manufacturing of a part at one or more task centers;
receiving one or more variables associated with a respective task;
receiving one or more variables associated with a respective task center; and
receiving one or more algorithms, each algorithm operable to determine a time value associated with a respective task, the time value representing a time period to complete the respective task;
the computer program further operable to:
receive an association of each of the plurality of time standard templates with one or more respective application sheets;
receive an association of each application sheet with one or more respective task centers;
receive a set of work instructions associated with the manufacture of the part;
receive an association of a task center planning group of the set of work instructions with one or more of the plurality of time standard templates;
generate a plurality of time standards associated with each task center planning group; and
store the time standards in a database.

19. The system of claim 18, wherein the computer program is further operable to receive an organization of the time standard templates by a plurality of categories.

20. The system of claim 18, wherein the computer program is further operable to store a plurality of versions of each time standard template in the memory.

21. The system of claim 18, wherein the computer program is further operable to receive one or more keywords associated with a respective time standard template to facilitate search capability.

22. The system of claim 18, wherein the computer program is further operable to receive one or more note files associated with a respective time standard template, each note file selected from the group consisting of a text file, an image file, an audio file, and a video file.

23. The system of claim 18, wherein the computer program is further operable to receive one or more tables, each table containing data configured to be called by a respective algorithm when determine the time value.

24. The system of claim 18, wherein at least one of the algorithms includes one or more process step sets.

25. The system of claim 18, wherein the computer program is further operable to:
receive a change to one of the variables associated with a respective task;
generate a new time standard based on the changed variable; and
store the new time standard in the database.

26. The system of claim 25, wherein the computer program is further operable to receive a global variable corresponding to a variable common to one or more time standard templates associated with the electronic work instructions that may be used to change a value used in determining all time standard templates associated with those particular electronic work instructions that contain the common variable.

27. The system of claim 18, wherein the computer program is further operable to receive an allocation of the time value associated with a respective task between a setup portion and a run portion of the respective task.

28. A system for managing time standards, comprising:
a computer-readable medium;
a computer program stored on the computer-readable medium operable to:
receive a set of work instructions associated with the manufacturing of a part;
receive an association of a task center planning group of the set of work instructions with one or more of a plurality of time standard templates, each time standard template comprising:
a task associated with the manufacturing of the part at a task center;
one or more variables associated with the task;
one or more variables associated with the task center; and
an algorithm operable to determine a time value associated with the task, the time value representing a time period to complete the task;
the computer program further operable to:
receive a change to one of the variables associated with the task;
generate a plurality of time standards associated with each task center planning group; and
store the time standards in a memory.

29. The system of claim 28, wherein the computer program is further operable to receive a global variable corresponding to a variable common to one or more time standard templates associated with the electronic work instructions that is used to change a value used in determining all time standard templates associated with those particular electronic work instructions that contain the common variable.

30. The system of claim 28, wherein the computer program is further operable to:
generate a plurality of time standard templates;
receive an association of each of the plurality of time standard templates with one or more respective application sheets; and
receive an association of each application sheet with one or more respective task centers.

31. The system of claim 28, wherein the computer program is further operable to receive one or more tables, each table containing data configured to be called by the algorithm when determine the time value.

32. The system of claim 28, wherein the algorithm includes one or more process step sets.

33. The system of claim 28, wherein the computer program is further operable to receive an allocation of the time value associated with the task between a setup portion and a run portion of the task.

34. The system of claim 28, wherein the computer program is further operable to receive one or more note files associated with the time standard template, each note file selected from the group consisting of a text file, an image file, an audio file, and a video file.

* * * * *